June 15, 1965 A. G. BUCKINGHAM ETAL 3,189,298
CONTROL APPARATUS FOR SPACECRAFT
Filed Aug. 6, 1962 3 Sheets-Sheet 1

WITNESSES:
Bernard R. Grigner
James F. Young

INVENTORS
Arthur G. Buckingham, Thomas P. Haney, John W. Knight and David W. Roese.

BY Ernest P. Klipfel
ATTORNEY

3,189,298
CONTROL APPARATUS FOR SPACECRAFT

Arthur G. Buckingham, Baltimore, Thomas P. Haney, Sykesville, John W. Knight, Baltimore, and David W. Roese, Catonsville, Md., assignors to Westinghouse Electric Corporation, East Pittsburgh, Pa., a corporation of Pennsylvania
Filed Aug. 6, 1962, Ser. No. 214,884
7 Claims. (Cl. 244—1)

The present invention relates to attitude control apparatus, and more particularly to attitude control apparatus utilizing magnetic coupling to the earth's magnetic field.

Apparatus for controlling the attitude of man-made satellites in space may be generally classified according to the type of actuation system employed. One type system used, a mass dispensing system, utilizes compressed air or a chemical propellant to generate the required control torque. Another type, a natural force system, manipulates natural forces of the space environment, such as aerodynamic pressure, solar pressure, the mass attraction of the earth and magnetically coupled forces, to generate the required torque. A major disadvantage of a mass dispensing system is that they have limited life due to the normal consumption of fuel, fuel storability and stability problems and leakage. On the other hand, the majority of the natural force systems provide very low torque levels; thus limiting utilization of these forces.

It is therefore an object of the present invention to provide new and improved space vehicle control apparatus which provides comparatively high torque levels and a long life, without restricting the attitude of the space vehicle.

It is a further object of the present invention to provide new and improved attitude control apparatus utilizing magnetic coupling between the earth's magnetic field and a magnetic field generated aboard the vehicle to provide desired control torque.

It is a still further object of the present invention to provide new and improved attitude control apparatus utilizing a method of magnetic coupling which provides a comparatively high control torque with a long lifetime, without restricting the attitude of the space vehicle.

Generally, the space vehicle control apparatus of the present invention accomplishes the above-stated objects by transferring momentum from the space vehicle to the earth's magnetic field. This is accomplished by measuring the unwanted momentum of the space vehicle, measuring the components of the earth's magnetic field and then generating the desired field aboard the vehicle to react with the earth's magnetic field to provide the desired momentum transfer torques.

These and other objects will become more apparent when considered in view of the following specification and drawings, in which.

When the short term effects of the earth's magnetic field—those occurring within an interval of several seconds—on a given space vehicle orbiting in space within a few thousand miles of the earth's surface are considered, it may be assumed that the earth's field is of constant magnitude and direction. If a current carrying coil were placed in this field, a torque would act on the coil in accordance with the following equation:

$$T = K_1 BINA \sin \theta$$

where, T is the torque acting on the vehicle; B is the earth's magnetic field strength; I is the current in the coil; N is the number of turns in the coil; A is the area of the coil, $\theta$ is the angle between the magnetic field of the coil and the magnetic field of the earth and $K_1$ is a constant of proportionality. The direction of the torque T will be in such a direction as to cause the alignment of the earth's field with the coil field in a plane containing both the coil field vector and the earth's field vector. This action is similar to that of a d'Arsonval galvanometer. When three such coils are disposed mutually perpendicular to each other and the current applied to the coils is varied in a predetermined manner, the resultant coil field may be directed in any direction and its magnitude varied over a wide range. The torque which would be generated by reacting the vector sum of the coil fields with that of the earth's magnetic field may be expressed as:

$$\vec{T} = K_2 \vec{B} \times \vec{I}$$

where $K_2$ is a constant.

Figure 1:
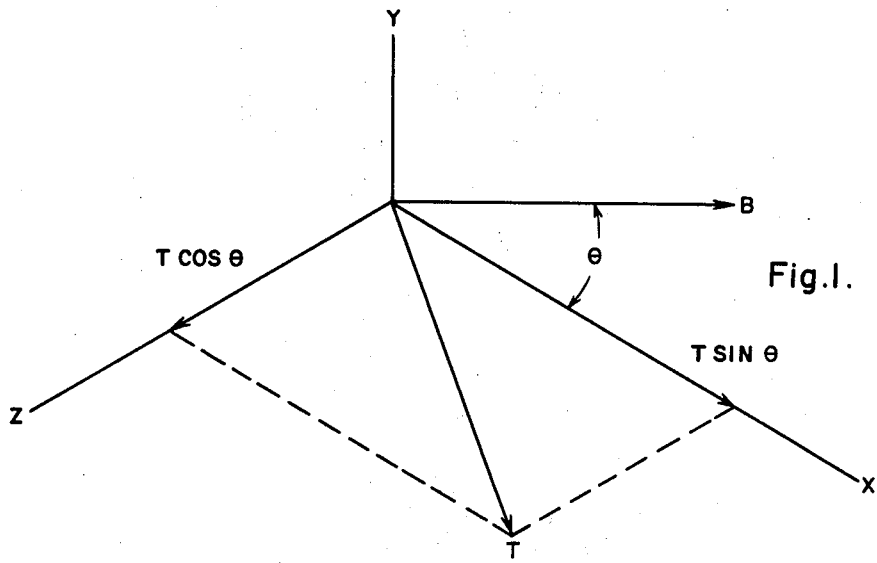
FIGURE 1 is a vector diagram showing the component of the control torque.

Referring to the vector diagram of FIG. 1, the direction of the torque T is always in a plane perpendicular to the earth's field B. By the proper computation of coil currents I, the direction of the resultant torque may be varied to lie anywhere in the plane perpendicular to this field vector. The flux vector generated by the coil currents is not restricted to lie in a plane perpendicular to the earth's field vector, however, optimum power efficiency results only under this condition. In order that a torquing system be used for precise attitude orientation, it must be capable of exerting torques in each of the three orthogonal control axes X, Y and Z of the vehicle. The magnitude of the control torques must be greater than the sum of internal and external disturbance torques acting upon the vehicle at any instant of time. While using the orthogonal current coils as a torquing system, the torque generated is always about an axis perpendicular to the earth's field B, and, therefore, can generate torque in only two of the vehicle's control axis when its third axis is parallel to the earth's field B. To permit torque generation about the third axis, inertia wheels or other similar momentum storing apparatus must be added to the system. Moreover, since the direction of the earth's field vector may be parallel to any axis of the vehicle, an inertia element must be added to each of the three axes to ensure complete control of the vehicle. Considering the case illustrated in FIG. 1, the earth's field vector B lies in the X plane as inclined at an angle $\theta$. If, for control purposes, a torque is desired about the X axis, the coil torquing system can develop to torque vector T which reflects a useful control of the torque $T \sin \theta$ about the X axis. However, an unwanted component $T \cos \theta$, is also reflected about the Z axis. This component must be balanced out by the reaction of an inertia control element in that axis. Thus, the control function about each of the three mutually perpendicular axes may be accomplished by inertia wheel control, with function of the wheel activation system being to transfer or dump the angular momentum stored in the wheels to the earth. Essentially, the coil activation system provides an upper limit to the angular velocity that an inertia wheel system, with fixed inertia, may not exceed even though there is the constant pressure of various vehicle disturbing torques.

The currents which must be supplied to three orthogonally disposed coils to provide the desired field to react with the earth's field may be derived from the following expression, which is the general vector equation relating to the momentum of the system, the earth's magnetic field and the current. This equation is:

$$\vec{I} = \frac{\vec{M} \times \vec{B}}{|HB^2|}$$

where, M is the angular momentum of the vehicle, and H is the field intensity of the earth's magnetic field. Solving this equation for the three currents in each of the orthogonal coils gives:

$$I_{cx} = \frac{M_y B_z - M_z B_y}{K_x} \quad (1)$$

$$I_{cy} = \frac{M_z B_x - M_x B_z}{K_y} \quad (2)$$

$$I_{cz} = \frac{M_x B_y - M_y B_x}{K_z} \quad (3)$$

where $I_{cx}$, $I_{cy}$ and $I_{cz}$ are coil currents in the respective coils; $B_x$, $B_y$ and $B_z$ are the components of the earth's magnetic field; $M_x$, $M_y$ and $M_z$ are the components of the momentum of the vehicle; and $K_x$, $K_y$ and $K_z$ are constants for a given vehicle attitude. If these currents are provided to the respective coils, the desired momentum transfer may occur.

Figure 2A:
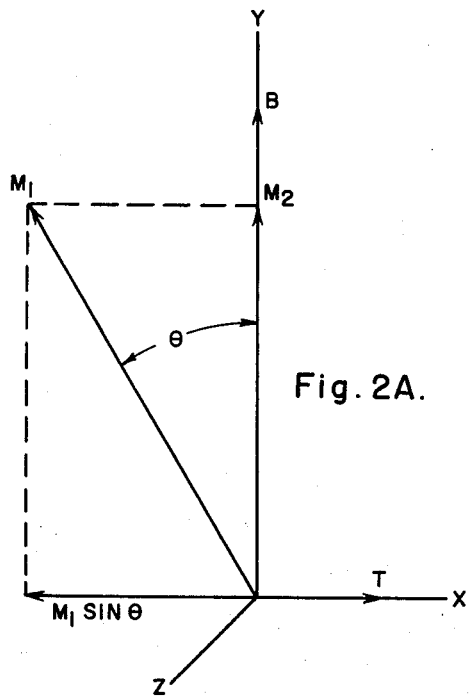
FIG. 2A is a vector diagram showing the momentum transfer operation.
Figure 2B:
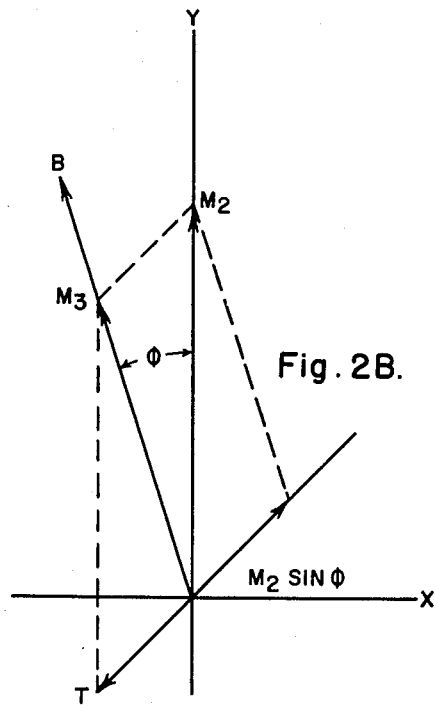
FIG. 2B is a vector diagram showing the momentum transfer operation.

FIGS. 2A and 2B show a vector diagram of the operation of the momentum transfer or dumping system. The total angular momentum of the vehicle, which, for example, may be stored in three mutually perpendicularly mounted inertia wheels, is represented by $M_1$ in FIG. 2A. When the momentum dumping system initially operates, the component of momentum $M_1 \sin \theta$, in the X direction, is removed. The component of momentum $M_2$, which is $M_1 \cos \theta$, is aligned with the earth's field vector B, in the Y direction. As the vehicle travels in orbit, the earth's magnetic field vector B will change with respect to the momentum vector $M_2$ at an angle $\phi$ from the Y direction, as is shown of FIG. 2B. An additional amount of the remaining momentum, which is stored in the inertia wheels, is removed here by the transfer system. The removal of the wheel momentum continues by this process until the threshold of the momentum transfer system is reached.

Figure 3:
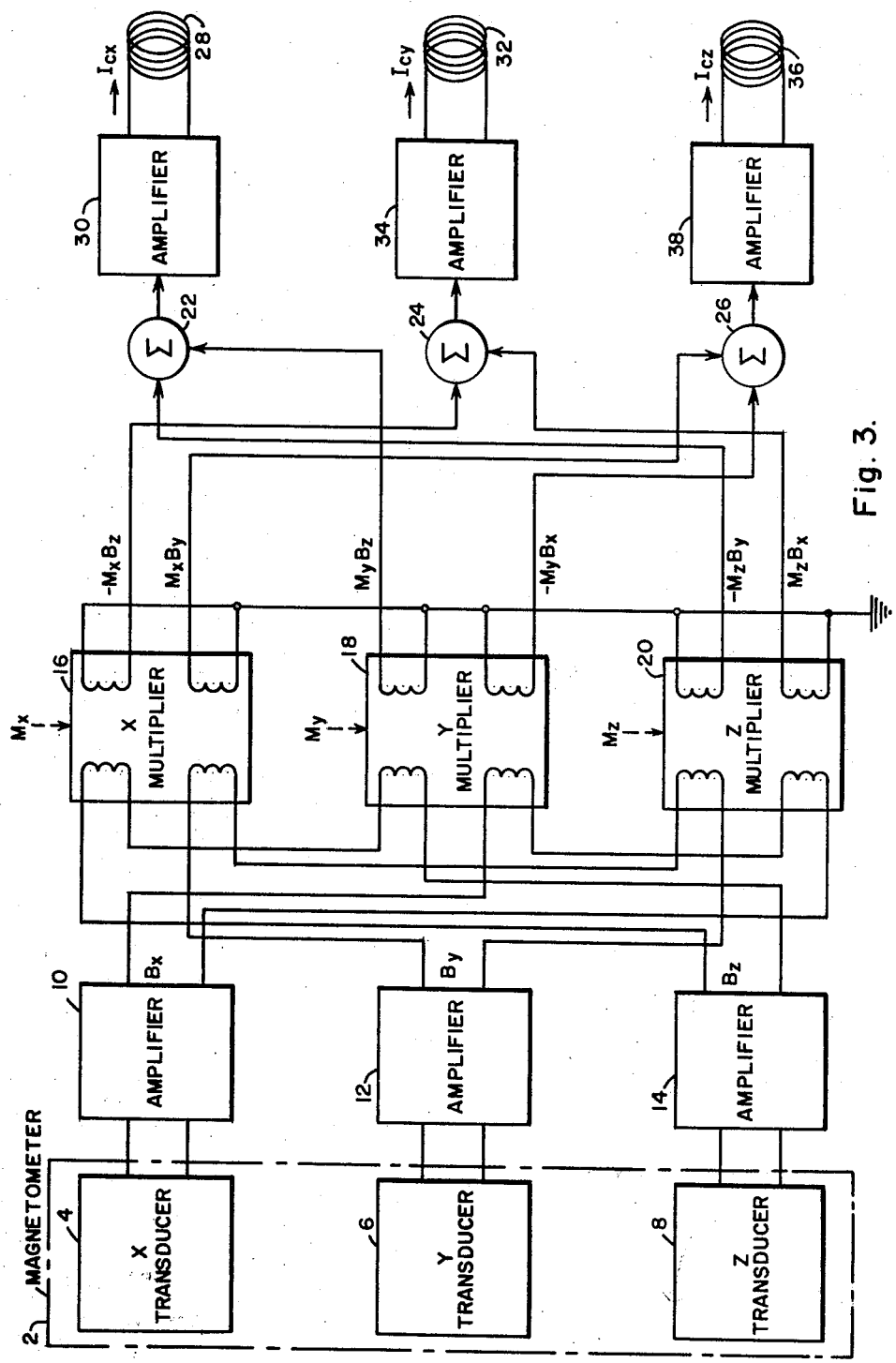
FIG. 3 is a schematic-block diagram showing the momentum transfer system of the present invention; and, FIG. 4 is a block diagram embodying the teachings of the present invention in an attitude control system.

Referring now to FIG. 3, a mechanization is shown to generate the desired coil currents $I_{cx}$, $I_{cy}$ and $I_{cz}$ which will produce a coil field to react with the earth's field in order to transfer the necessary momentum from the vehicle to control its attitude or momentum. Transducers 4, 6 and 8 are provided in the magnetometer 2 for each of the three directions X, Y and Z. The X transducer 4 supplies an electrical signal $B_x$ which is proportional to the earth's magnetic field in the x direction. The Y transducer 6 and the Z transducer 8 produce electrical signals proportional to the Y component $B_y$, z component $B_z$ of the earth's magnetic field, respectively. These signals may be alternating or unidirectional. Also, if a unidirectional signal is used it may be modulated with a suitable signal and then utilized. The outputs of each of the transducers 4, 6 and 8 of the magnetometer 2 are amplified by the amplifiers 10, 12 and 14, respectively. The outputs of the amplifiers are then applied to the multiplying devices 16, 18 and 20 in such a manner that the outputs of the multipliers are the cross products of the momentum and the earth's magnetic field. The multipliers 16, 18 and 20 may, for example, comprise tachometer generators or rate gyros having dual pickoffs. These devices are well known in the art an function to multiply an electrical input with a mechanical input. In the present case, the mechanical input is proportional to the angular momentum of the vehicle in a particular direction and the electrical input applied to the two input coils is proportional to the components of the earth's field. The product of the mechanical input and the electrical input at each of the inputs of the multipliers are provided at separate outputs of the multipliers. As is shown in FIG. 3: the X component of the earth's magnetic field $B_x$ is applied to the Y and Z multipliers 18 and 20, respectively; the Y component of the earth's magnetic field $B_y$ is supplied to the X and Z multipliers 16 and 20, respectively, and the Z component of the earth's magnetic field $B_z$ is supplied to the X multiplier 16 and the Y multiplier 18. The outputs of the multipliers 16, 18 and 20 are then applied to the summing devices 22, 24 and 26, which may, for instance, be summing potentiometers. The output $-M_x B_z$ of the X multiplier 16 is supplied to the summing device 24 to be added to the output $M_z B_x$ from the Z multiplier 20. The output $M_y B_z$ from the Y multiplier 18 is supplied to the summing device 22 to be added to the $-M_z B_y$ output from the Z multiplier 20. The $M_x B_y$ output from the X multiplier 16 is supplied to the summing device 26 to be added to the $-M_y B_x$ output from the Y multiplier 18. The signal output from the summing device 22 is amplified in the amplifier 30 and then supplied to the coil 28. The signal $M_y B_x - M_z B_y$ applied to the X coil 28 is proportional to the current $I_{cx}$ required to be applied in the coil 28, as is shown by Equation 1, to control the vehicle. The output of the summing device 24 is proportional to $M_z B_x - M_x B_z$, which is proportional to the current $I_{cy}$ of Equation 2 desired to be applied to the Y coil 32. This output from the summing device 24 is applied to the Y coil 32 after being amplified in the amplifier 34. The output from the summing device 26 is proportional to $M_x B_y - M_y B_x$, which is proportional to the current $I_{cz}$ of Equation 3, and is applied to the Z coil 36 through the amplifier 38. It can be seen by comparing the currents applied to the coils 28, 32 and 36 with Equations 1, 2 and 3 that they correspond to the currents desired to be generated therein to supply the momentum transfer to the earth's magnetic field so that the vehicle may be controlled.

Figure 4:
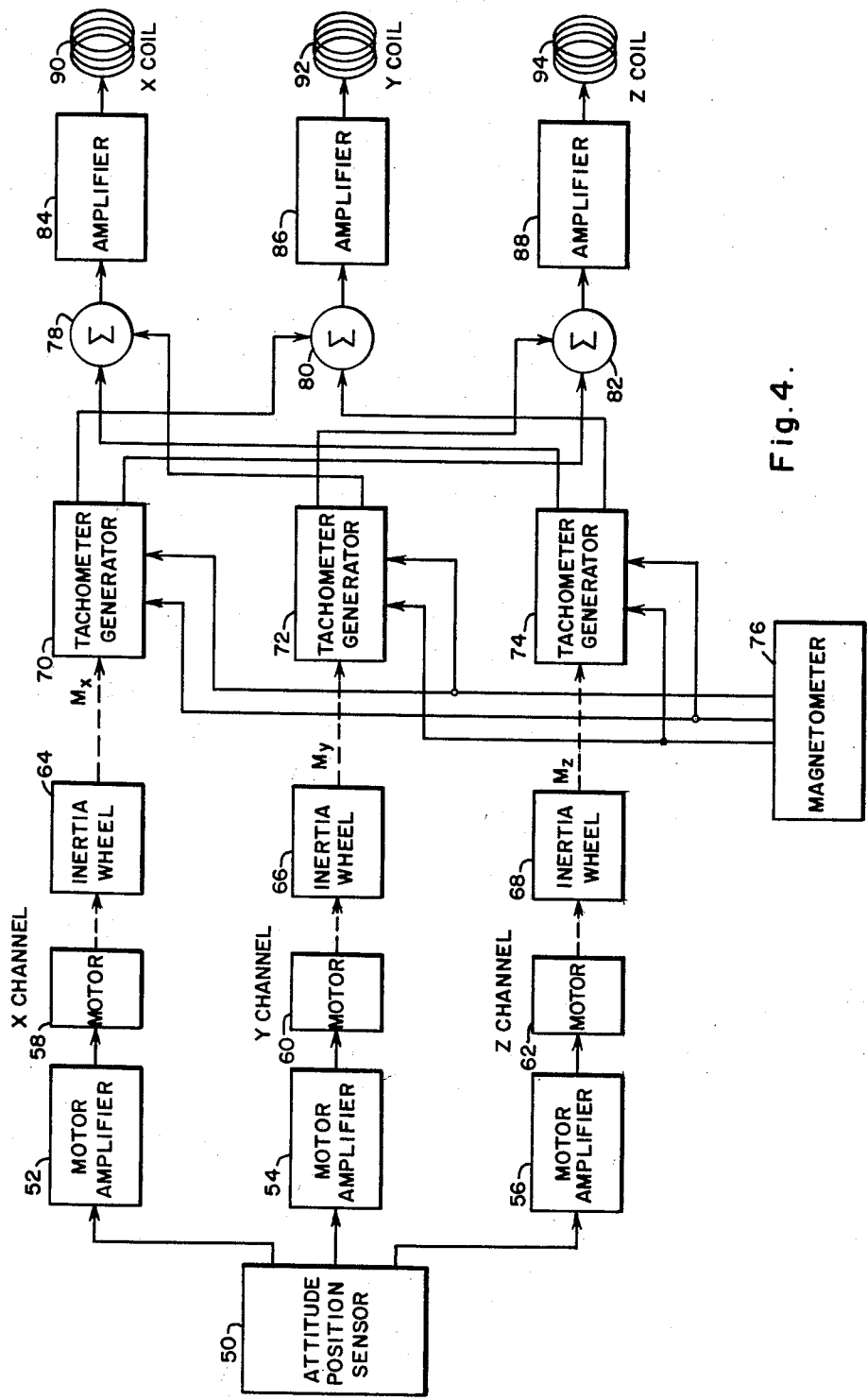

In FIG. 4, is shown an attitude control system for stabilizing a vehicle in space. The attitude position sensor 50 supplies attitude control signals to the X, Y and Z channels of the system. The attitude position sensor may, for example, be such to stabilize the vehicle to the celestial sphere such as through a star tracker system whose error signals are measured and converted into vehicle coordinates. Also infra-red earth sensors and yaw angle sensors could be used to supply the attitude position control signal to the various channels. The attitude signals are amplified in the motor amplifiers 52, 54 and 56 for the X, Y and Z channels, respectively. The output signals from the amplifiers 52, 54 and 56 are applied to drive the motors 58, 60 and 62 of the X, Y and Z channels, respectively. In turn, the motors drive inertia wheels 64, 66 and 68, in a manner well known in the art, to provide an angular momentum relating to the particular attitude position sensed. The outputs of the inertia wheels 64, 66 and 68 are then applied to the mechanical input shafts of the tachometer generators 70, 72 and 74, respectively, to provide the appropriate moment of inertia values $M_x$, $M_y$ and $M_z$, respectively. Also applied to the tachometer generators are the electrical inputs from the magnetometer 76. The tachometer generators 70, 72 and 74 provide the respective cross products of the mechanical momentum input signal times the electrical signal from the magnetometer 76 at its two output terminals. These cross products terms are then applied to the summing devices 78, 80 and 82 as explained in relation to FIG. 3. The output of the summing devices are proportional to the current that is necessary to be supplied to the three coils to provide the desired control torque in response to the attitude control signal applied from the attitude position sensor 50. The signals proportional to the currents $I_{cx}$, $I_{cy}$ and $I_{cz}$ are amplified in the amplifiers 84, 86 and 88 and then applied respectively to the X, Y and Z coils 90, 92 and 94. The field generated by the currents in the three orthogonally disposed coils generate a torque in such a direction as to transfer the angular momentum stored in the inertia wheels to the earth's magnetic field in such a manner as to maintain the vehicle at a predetermined attitude with respect to its coordinate system. If it is desired only to control the momentum of the vehicle itself rather than to control its attitude, rate gyros may be substituted for the tachometer generators. Such a system will act to reduce the angular momentum of the vehicle to the threshold of the gyro and so may be used to control any spin the vehicle may have while in orbit. In such a system, inertia wheels would not be necessary in that the gyros acting themselves will reduce the momentum of the vehicle to the threshold value of the rate gyros themselves.

Although the present invention has been described with a certain degree of particularity, it should be understood that the present disclosure has been made by way of example and that numerous changes in the details of the construction and the combination or arrangement of parts may be resorted to without departing from the scope and spirit of the present invention.

We claim as our invention:

1. In control apparatus of a space vehicle operative with input orientation information, the combination of: field measuring means providing field signals proportional to the earth's magnetic field at the vehicle; momentum means for providing momentum signals proportional to the momentum of the vehicle in response to said input information; multiplying means to provide product signals of said momentum signals and said field signal generators; and conversion means to provide control signals to effect control of the vehicle in response to said product signals.

2. In attitude control apparatus of a space vehicle operative with input orientation information, the combination of: field measuring means for providing field signals proportional to the earth's magnetic field at the vehicle; momentum storing means including means for providing momentum signals proportional to the momentum of the vehicle in response to said input information; multiplying means to provide product signals of said momentum signals and said field signals; and conversion means including three orthogonally disposed coils to provide control signals to effect attitude control of the vehicle in response to said product signals.

3. In attitude control apparatus of a space vehicle operative with input orientation information, the combination of: field measuring means including a magnetometer for providing field signals proportional to the components of the earth's magnetic field at the vehicle; momentum storing means including inertia wheels for providing momentum signals proportional to the momentum of the vehicle in response to said input information; multiplying means including tachometer generators to provide product signals of the momentum signals and the field signals applied to said tachometer generators, and conversion means including three orthogonally disposed coils to provide signals to effect attitude control of the vehicle in response to said product signals.

4. In control apparatus for transferring momentum from a space vehicle to the earth's magnetic field the combination of: a magnetometer for providing field signals proportional to the components of the earth's magnetic field at the vehicle; means for providing momentum signals proportional to the angular momentum components of the vehicle; multiplying means to provide the cross product signals of said momentum signals and said field signals; and three orthogonally disposed coils to provide momentum transfer torque signals in response to said cross product signals.

5. In control apparatus for transferring momentum from a space vehicle to the earth's magnetic field the combination of: a magnetometer having three transducers for providing field signals proportional to the three orthogonal components of the earth's magnetic field at the vehicle; means for providing momentum signals proportional to the three components of the momentum of the vehicle; three tachometer generators to provide the cross product signals of said momentum signals and said field signals applied to said tachometer generators; and three orthogonally disposed field producing coils to provide momentum transfer torque signals in response to said cross product signals.

6. In attitude control apparatus of a space vehicle; said apparatus having three channels and being operative with input orientation information, the combination of: a magnetometer for providing field signals proportional to the three orthogonal components of the earth's magnetic field at the vehicle to be applied to each channel of the apparatus; an inertia wheel disposed mutually perpendicular in each channel for providing momentum signals proportional to the three components of the angular momentum of the vehicle in response to said input information; a tachometer generator disposed in each channel and being operative to provide product signals of the momentum signals of the same channel as the tachometer generator and the field signals of the other two channels; and a field producing coil being orthogonally disposed in each channel to provide control signals to effect attitude control of the vehicle in response to the sum of the product signals from the other two channel from the channel of that coil.

7. In apparatus for the control of a space vehicle, said apparatus having three channels and being operative with input orientation information, the combination of: a magnetometer for providing field signals proportional to the three components of the earth's magnetic field at the vehicle; momentum means for providing momentum signals for each channel proportional to the three components of momentum of the vehicle in response to said input information; multiplying means disposed in each channel to provide product signals of the momentum signals of the same channel as the multiplying means and the field signals of the other two channels; and a field producing coil orthogonally disposed in each channel to provide control signals to effect momentum control of the vehicle in response to the sum of the product signals from the other two channels from the channel of the coil to which the product signals are being applied thereto.

References Cited by the Examiner
UNITED STATES PATENTS 3,061,239 10/62 Rusk ------------------ 244—1
3,116,035 12/63 Cutler ----------------- 244—1

OTHER REFERENCES

Navigation Magazine, spring, 1958, vol. 6, No. 1, pp. 66–71.

FERGUS S. MIDDLETON, *Primary Examiner.*

RALPH D. BLAKESLEE, *Examiner.*